United States Patent Office 2,713,240
Patented July 19, 1955

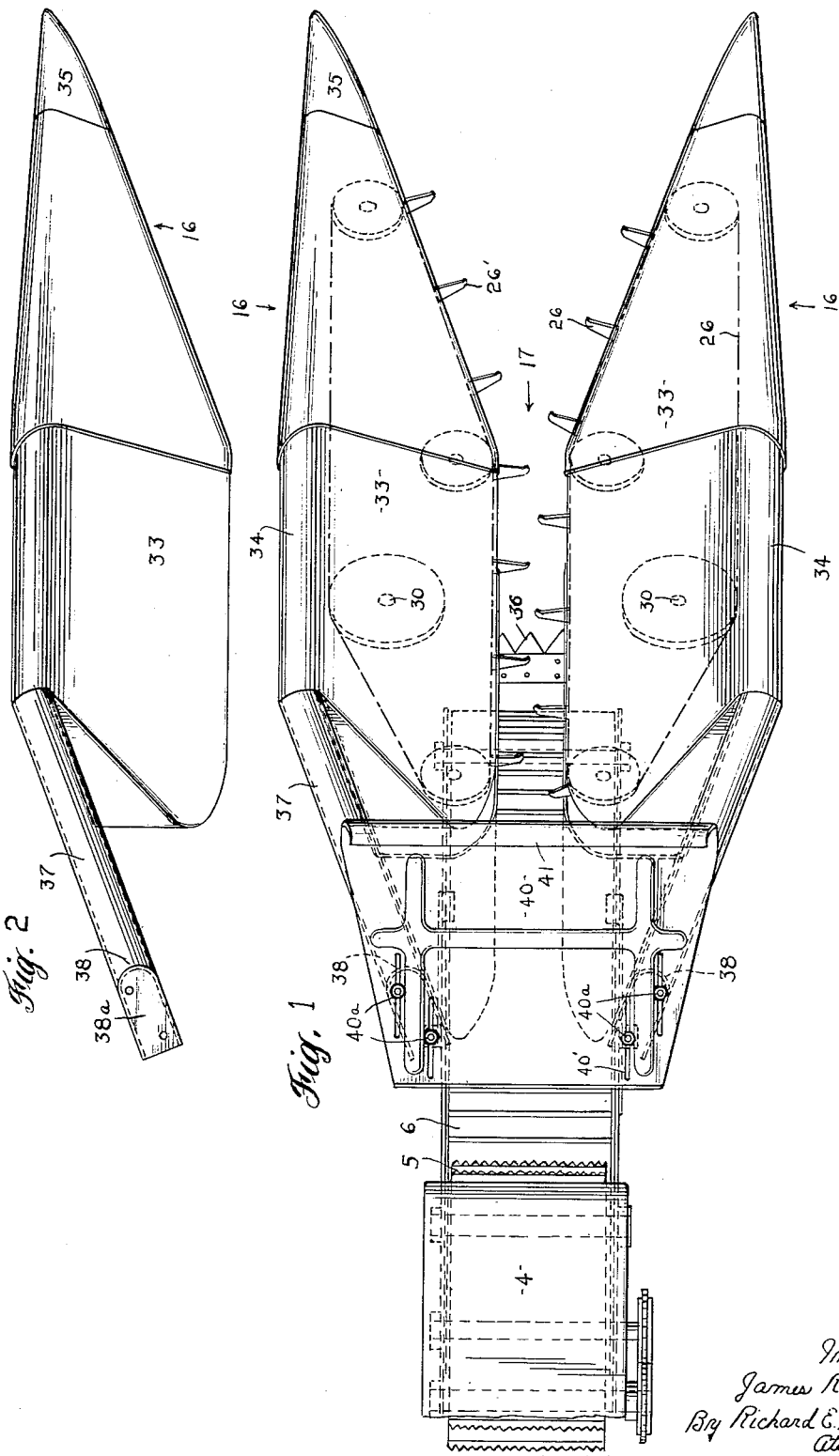

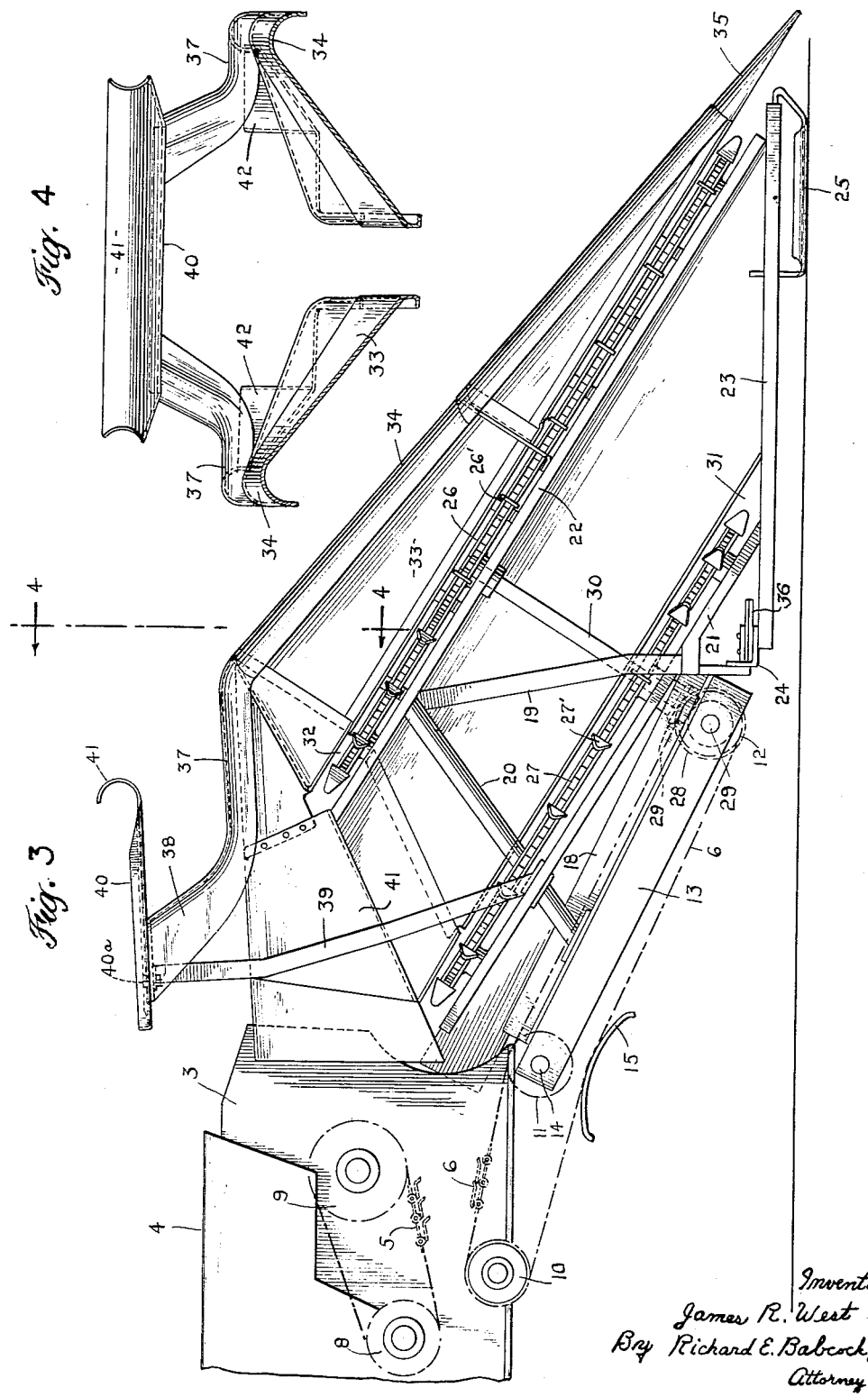

2,713,240

ROW CROP ATTACHMENT FOR ENSILAGE HARVESTER

James R. West, New Holland, Pa., assignor to The Sperry Corporation, New Holland, Pa., a corporation of Delaware Application April 27, 1953, Serial No. 351,257

5 Claims. (Cl. 56—98)

This invention relates to a mobile stalk processing machine such as exemplified by an ensilage harvester or the like, adapted to harvest and process stalks standing in rows.

An ensilage harvester usually embodies a portable vehicle adapted to travel down a row of stalks and has vertically opposed feed elements for gripping the incoming stalks between them and delivering them to suitable processing mechanism which in the case of an ensilage harvester will comprise suitable chopping and blowing means. Gathering means in advance of the stalk processing means comprises mechanism for severing the stalks and delivering them butt first between the opposed feed elements. Such gathering means or attachment includes generally a pair of laterally opposed gathering frames defining between them a vertical stalk receiving passage in advance of and aligned with the feed elements, together with suitable conveying mechanism for moving the stalks through such passage to the feed elements. The gathering frames customarily are provided with rearwardly and upwardly inclined fenders or surfaces over which down stalks may ride and be supported during their movement through the gathering means.

With such conventional gathering means considerable difficulty has been encountered in the harvesting of corn stalks which have been wholly or partially knocked down either by storms or more frequently by the passage of a corn harvesting machine thereover. Such down corn as above mentioned will tend to ride up over the fenders beyond the point where their butt ends might be delivered between the vertically opposed feed elements as desired and may accumulate sufficiently to jam and appreciably decrease the operating efficiency of the mechanism.

With the foregoing in mind it is the primary object of the present invention to provide a row crop gathering attachment adapted for association with the opposed feed elements of a forage harvester or other mobile stalk processing machine in such manner that the severed down stalks ride upwardly over guides defined by the respective fenders to the desired height, for proper reception of their butt ends between the feed elements, then are moved rearly toward the feed elements over horizontal portions of said guides while being maintained at said height until their butt ends are operatively received by said elements. In conjunction with the horizontal sections or portions of the guide fenders which thus maintain the stalks at constant height, there are provided abutments to limit the rearward movement of the stalks and to be engaged by the stalks once their butt ends have been received between the feed elements, whereby the feed elements may pull them in an endwise direction around said abutments and deliver them into the stalk processing machine.

A further feature of the invention consists in the provision of a preferably adjustable holddown plate supported between the respective abutments to press down the ends of upstanding stalks to facilitate their endwise delivery between the feed elements.

My invention includes the row crop gatherer or attachment per se, as well as in combination with the feed elements of the field forage harvester or other processing machine with which it cooperates.

The foregoing objects and advantages are all attained by the preferred embodiment of the invention described in detail in the following description and illustrated in the accompanying drawings in which:

Figure 1 represents a plan view of the row crop attachment of the invention assembled in operative relationship with the feed mechanism of a usual ensilage harvester, elements of such feed mechanism being shown diagrammatically;

Figure 2, a plan view of one of the two symmetrically disposed guides or fenders over which the down stalks travel during their passage through the attachment.

Figure 3, a side elevation of the parts illustrated in Figure 1; and,

Figure 4, a detail section on the line 4—4 of Figure 3 looking in the direction of the arrows.

In the accompanying drawings, I have illustrated my invention in its operative application to a conventional wheel supported field forage harvester, of which the feed mechanism only is shown. Such feed mechanism comprises a usual feed box or passageway defined by the opposed sides 3—3, and preferabdy the top or cover 4. Vertically opposed upper and lower feed elements preferably in the form of endless aprons 5 and 6 respectively are operatively supported in the feed box to feed material rearwardly into and through same and into the blower and chopper housing of the ensilage harvester (not shown), to be there acted on in usual manner. The upper feed apron 5 may be of the endless cross-slat type rotatably supported on sprockets 8 and 9 respectively for vertical floating movement substantially as shown and described in the U. S. patent to Sensenig No. 2,402,849 of June 25, 1956. Inasmuch as the upper and lower feed mechanisms are purely conventional, they are illustrated but diagrammatically in Figure 3. The lower feed apron 6 is also of the cross-slat endless type guided around the sprockets 10, 11 and 12 respectively. The sprockets 10 and 11 are rotatably mounted for movement about fixed axes on the field forage harvester frame, while the sprockets 12 are rotatably supported at the free ends of links 13 which are swingable about the fixed axes 14 of the sprockets 11. Thus the forwardly projecting swingable portion of the lower feed element 6 may be swung downwardly in close proximity to the surface over which the machine is moving in order to elevate the butt ends of the corn stalks from their point of severance to urge them beneath the upper feed element 5. A guide plate 15 fixedly supported beneath the sprocket 11 serves to maintain the conveyor 6 taut throughout the range of swinging movement of the links 13.

The foregoing structure is purely conventional and such as is now embodied in commercially available field forage harvesters. Also, as in such commercially available machines it is contemplated that suitable means will be provided for maintaining a resilient floating support for the links 13 and the attachments carried thereby.

The row crop attachment or gathering means of the invention, which is adapted for mounting on the links 13 of the swingable forward portion of feed element 6, is similar in its general organization to the mechanism disclosed in my prior Patent 2,524,151 of October 3, 1950, comprising relatively laterally opposed gathering members 16—16 defining between them a vertical stalk receiving passage 17 in advance of and aligned with the vertically opposed feed elements 5 and 6 in the direction of travel of said machine. Each of the members 16 includes a rigid framework having a supporting base member 18 which is fixedly secured and supported on one of the link members 13, or otherwise fixedly associated with the swingable advance portion of the lower feed element 6. Projecting upwardly from the base 18 of each frame are the rigid support members 19 and 20 (Figure 3) to which are secured the rearwardly upwardly inclined frame members 21 and 22 respectively, the lower forward ends of these members 21 and 22 being rigidly interconnected and braced by the horizontal member 23 which also is preferably interconnected to the lower end of the member 19 by an angle iron 24 as shown. A skid or shoe 25 carried at the forward end of the frame member 23 is adapted to ride along over the ground and guide the floatingly supported member 16 over irregularities in the terrain traversed.

Operatively supported in each frame is suitable conveying means for delivering the stalks rearwardly and upwardly for reception between the vertically opposed feed elements 5 and 6. Preferably the conveying means of each of the members 16 is of purely conventional type embodying the upper and lower conveyor chains 26 and 27 respectively provided with laterally extending feed fingers 26' and 27'. Each of these chains 26, 27 is guided around a series of sprockets, as shown, with its laterally inner operative run having the feed fingers 26' and 27' thereof respectively projecting into and movable rearwardly through the stalk receiving passage 17.

The drive for the conveyors 26, 27 of each gathering member may be conveniently derived from the lower feed element 6 by means of beveled gears 28 keyed on the ends of the shaft 29 which supports and is rotatable with the sprockets 12 at the lower advance end of the feed element 6. These beveled gears 28 respectively mesh with bevel gears 29 keyed on the driven shafts 30 of the respective members 16. These driven shafts 30 carry sprockets in operative engagement with the respective chains 26 and 27 as will be understood by those skilled in the art.

Preferably the inner faces of the respective members 16 are covered with sheet metal formed to define slots 31 and 32 through which the respective lower and upper conveyors may operate.

Suitably supported above the uppermost conveyor chain 26 of each member 16 is a suitable fender including downwardly and inwardly converging portions 33 overlying the respective chain conveyors 26 to properly guide the stalks and foliage thereof into operative engagement with the said chains in accordance with usual practice. The upper outer edge portions 34 of these respective members are laterally rounded to be of generally inverted U cross-sectional shape as best indicated in Figure 4. These said outer edge portions 34 define rearwardly and upwardly inclined advance sections of a stalk guide extending rearwardly continuously from usual divider points 35 of the structure, and being substantially coterminous rearwardly with the upper conveyor chains 26. It will be seen that as the divider points 35 move forwardly beneath down or reclining stalks, these stalks will ride upwardly and be draped outwardly over the inclined advance sections 34 of the stalk guide as they are conveyed upwardly thereby by the action of the chains 26 and 27.

A conventional reciprocating sickle mechanism generally designated 36 is supported across the frames 16—16 just in advance of the forward end of the lower feed element 13 and rearwardly of the advance ends of the conveyor chains 26 and 27, whereby the stalks after being engaged by said conveyor chains are severed by the sickle 36 and the butt ends, at least of the upstanding stalks, may rest on and be assisted in their rearward elevating movement by the feed element 6.

The advance sections 34 of the respective stalk guides merge rearwardly with horizontal guide sections 37 on the respective members 16 and as shown in Figures 2 and 4, these horizontal sections 37 may constitute rearward extensions or continuations of the sections 34 and may be of substantially inverted U-shaped cross-section. Thus the down or reclining stalks may ride up on the advance guide sections 34 until their butt ends are substantially at the proper height for reception between the feed elements 5 and 6 and will be maintained at such proper height as they are urged rearwardly over the horizontal sections 37 by the pressure of incoming stalks until their butt ends are received and gripped between the vertically opposed feed elements 5 and 6. Upwardly turned forwardly rounded abutments 38 at the rear terminal ends of the respective sections 37 engage the stalks after they have been gripped between the opposed feed elements 5 and 6 and present forwardly directed smoothly rounded surfaces around which the respective stalks may be pulled in an endwise direction as they are fed between the feed elements 5 and 6. Inasmuch as these sections 37 and 38 will be of relatively light cheap metal construction it is desirable to brace them as at 39 (Figure 3).

In order to insure that the standing or more or less upright stalks are delivered butt first between the feed elements 5 and 6 it is desirable to provide a holddown or retarder plate 40 horizontally supported on and between the horizontal upper ends 38' of the respective abutments 38. This plate 40 is provided with a smoothly rounded forward edge portion 41 disposed in the path of movement of the upper ends of any upright stalks to retard the movement of such upper ends relative to the butt ends and thereby cause such butt ends to enter between the elements 5 and 6 in a generally reclining or endwise position. As shown in Figures 3 and 4, baffle plates 42 extending rearwardly from the inner side walls of the horizontal section 37 overlap the sides 3 of the feeder box to insure guiding of the corn stalks thereinto. In order that the holddown or retarder plate 40 may be positioned to engage corn of varying heights at the optimum point to insure entry of its butt ends between the members 5 and 6, it is desirable to provide for longitudinal adjustability of plate 40. This is done in the preferred embodiment by providing said plate with slots 40' through which are disposed the bolts 40a which secure the plate 40 against the horizontally disposed upper ends 38a of the respective abutments 38.

In the operation of the invention which is believed to be readily apparent from the foregoing description, as a field forage harvester having my row crop attachment mounted thereon, is advanced along a row of stalks of corn or other crop material, the said stalks will be received between the opposed chains 26—26 and 27—27 to commence their rearward movement, then will be severed by the action of the sickle knife 36, whereupon the respective stalks will be delivered rearwardly and upwardly by the chains 26 and 27 for endwise passage between the feed elements 5 and 6. It will be noted that the upper chains 26 terminate rearwardly before the chains 27 so that the upper ends of the upstanding stalks which abut against the forward edge portion 41 of the holddown plate 40 will have passed completely through the upper chains 26 and will be held stationary while the lower or butt ends thereof continue their rearward movement and are thus swung about the member 41 by the action of chains 27 and/or the conveyor 6 to enter in an endwise direction between the elements 5 and 6.

The down or reclining stalks on the other hand will be draped over and ride upwardly on the respective inclined guide sections 34 until they reach the optimum height for delivery of their butt ends between the elements 5 and 6 at which time they will be received on the horizontal sections 37 of the respective gathering members. It will be noted that the upper chains 26 terminate rearwardly substantially co-extensively with the inclined guide sections 34 to avoid continued elevation of the said stalks once they are received on the horizontal sections 37. However, the pressure of incoming stalks will continue to feed said stalks rearwardly along the sections 37 until the butt ends of the said stalks are received between the feed rolls 5 and 6, whereupon the action of the feed elements 5 and 6 will tend to draw these stalks in an endwise direction over the rounded forward faces of the abutments 38 and thus feed them into the field forage harvester or other crop feeding mechanism associated with said feed elements 5 and 6.

The substantially upright or upstanding stalks will not necessarily be acted upon by the aforementioned stalk guides 34, 37, 38 but will be placed in substantially endwise positions by the joint action of the lower chains 27 and the forward edge 41 of the holddown plate for reception of their butt ends between the feed elements 5 and 6, as above mentioned.

The drawings herein have been made from an actual operative embodiment of the invention which has been tested under actual field conditions and has been found to operate successfully on both down stalks and upstanding stalks or mixtures of the two. In particular such an attachment has been found to be especially adapted for use in harvesting corn stalks from which the ears of corn have previously been removed by usual corn harvesting mechanism, the operation of which has served to knock over many of the stalks and to render the harvesting of such stalks by conventional row crop attachments, extremely difficult and unsatisfactory.

Having thus shown and described the preferred mode contemplated by me of carrying out my invention, I claim:

1. In a forwardly moving row crop harvesting attachment for severing and conveying stalks of crop material, said attachment including laterally opposed gathering members defining between them a vertical stalk receiving passage, and rearwardly and upwardly moving conveying means in said passage carried by said members for conveying severed stalks through said passage, the combination of upwardly presented stalk guides carried by each said member, each said guide extending longitudinally in the direction of movement of the attachment and including a rearwardly upwardly inclined advance section whereby bent stalks supported over said section will be moved rearwardly and upwardly thereon by the conveying means, a horizontal section rearwardly of and smoothly merging with said advance section for receiving the stalks from said advance section and guiding them rearwardly at a constant level, said horizontal sections converging rearwardly toward said conveyors and terminating rearwardly in upstanding forwardly disposed abutments around which said stalks may be drawn in endwise directions, said abutments being located wholly above said gathering members, and said conveying means moving rearwardly beyond said abutment to swing the depending ends of the bent stalks rearwardly and upwardly about fulcrums located on said horizontal sections.

2. The combination of claim 1 wherein said conveying means comprises upper and lower gathering chains, said upper gathering chains terminating forwardly of said abutments, whereby stalks approaching said abutments on said horizontal guide sections will be free of the action of said upper gathering chains, said lower gathering chains extending rearwardly beyond said abutments whereby the butt ends of stalks engaged against such abutments may be swung rearwardly by such lower gathering chains to present the butt ends of the said stalks in an endwise direction.

3. In a forwardly moving portable row crop harvesting attachment for severing and conveying stalks of crop material, said attachment including laterally opposed gathering members defining between them a vertical stalk receiving passage, and rearwardly upwardly moving conveyers carried by one of said members in said passage for conveying severed stalks through said passage, the combination of upwardly presented stalk guides carried by each said member, each said guide extending longitudinally in the direction of movement of the attachment and including a rearwardly upwardly inclined advance section, whereby stalks bent over and supported on said section will be moved rearwardly and upwardly thereon by the conveying means, a horizontal section rearwardly of and smoothly merging with said advance section for receiving the bent stalks from said advance section and guiding them rearwardly at a constant level, said horizontal sections converging rearwardly towards said conveyers and terminating rearwardly in upstanding forwardly disposed abutments located wholly above said guides.

4. In a forwardly moving portable row crop harvesting attachment for severing and conveying stalks of crop material, said attachment including laterally opposed gathering members defining between them a vertical stalk receiving passage, and upwardly and rearwardly moving conveying means carried by one of said members in said passage for conveying severed stalks through said passage, the combination of upwardly presented stalk guides carried by the respective members, each said guide extending longitudinally in the direction of movement of the attachment and including a rearwardly upwardly inclined advance section, and a horizontal section rearwardly of and smoothly merging with said advance section, said horizontal section converging rearwardly toward said conveying means, said horizontal sections terminating rearwardly in forwardly disposed abutments around which the stalks may be drawn, said abutments being located wholly above said gathering members.

5. In a forwardly moving portable row crop harvesting attachment for severing and conveying stalks of crop material, said attachment including laterally opposed gathering members defining between them a vertical stalk receiving passage, and upwardly and rearwardly moving conveying means carried by said attachment in said passage for conveying severed stalks through said passage, the combination of stalk guides carried by one of said members, said guide extending longitudinally in the direction of movement of the attachment and including a rearwardly upwardly inclined advance section, whereby stalks supported over said section will be moved rearwardly and upwardly, and a horizontal section rearwardly of and smoothly emerging with such advance section for receiving the stalks from said advance section and guiding them rearwardly at a constant level, said horizontal section terminating rearwardly in an abutment located wholly above said advance section, said conveying means extending rearwardly beyond said abutment to swing bent stalks rearwardly and upwardly about their points of support on said horizontal section.

References Cited in the file of this patent

UNITED STATES PATENTS

| | | |
|---|---|---|
| 1,764,947 | Frank | June 17, 1930 |
| 2,442,520 | Van Sickle | June 1, 1948 |
| 2,456,404 | Good | Dec. 14, 1948 |
| 2,524,151 | West | Oct. 3, 1950 |
| 2,629,978 | Krause et al. | Mar. 3, 1953 |